United States Patent [19]

Fischbeck et al.

[11] 4,349,828

[45] Sep. 14, 1982

[54] METHOD AND APPARATUS FOR OSCILLATING AN ARRAY OF MARKING ELEMENTS

[75] Inventors: Kenneth H. Fischbeck, Dallas; Marcus M. Schnarr, Lewisville, both of Tex.; Demetris F. Paraskevopoulos, Pittsford, N.Y.

[73] Assignee: Xerox Corporation, Stamford, Conn.

[21] Appl. No.: 118,023

[22] Filed: Feb. 4, 1980

[51] Int. Cl.³ .............................................. G01D 15/18

[52] U.S. Cl. ........................................ 346/1.1; 346/75; 346/140 R

[58] Field of Search ....................... 346/75, 1.1, 140 IJ, 346/140 PD

[56] References Cited

U.S. PATENT DOCUMENTS

| | | | |
|---|---|---|---|
| 3,644,931 | 2/1972 | Stringer et al. | 346/74 E |
| 3,693,181 | 9/1972 | Marshall et al. | 346/74 ES |
| 3,737,914 | 6/1973 | Hertz | 346/75 |
| 3,752,288 | 8/1973 | Detig et al. | 197/1 R |
| 3,852,772 | 12/1974 | Hecht et al. | 346/75 |
| 4,050,075 | 9/1977 | Hertz et al. | 346/75 |

*Primary Examiner*—George H. Miller, Jr.
*Attorney, Agent, or Firm*—Richard A. Tomlin

[57] ABSTRACT

A method and apparatus for marking wherein an array of marking elements is used to mark on a continuously moving mark-receiving surface. In order to provide a rectangular grid in an efficient manner, the array is oscillated both perpendicular and parallel to the direction of movement of the mark-receiving surface.

2 Claims, 11 Drawing Figures

METHOD AND APPARATUS FOR OSCILLATING AN ARRAY OF MARKING ELEMENTS

The invention relates to an improved method for oscillating an array of marking elements. Marking systems, which utilize arrays of marking elements include, for example, electrostatic, magnetic, heat and ink jet systems. Normally, these arrays are used to mark a continuously moving mark-receiving surface, for example, paper or a heat-sensitive surface. If the array is held stationary, the difinition of the resulting image depends on the number of marking elements and their spacing. It is usually undesirable economically to have a large number of marking elements in an array, and it is often difficult to manufacture an array with densely packed marking elements. To increase image definition with a given number of marking elements, the array can be oscillated in a direction perpendicular to the direction of movement of the mark-receiving surface as is well known. This results in a sinusoidal trace on the continuously moving mark-receiving surface. This sinusoidal trace is not convenient for forming a rectangular grid preferred for most marking uses.

In the instant invention, to provide a better system for forming a rectangular grid, the array is oscillated not only in a direction perpendicular to the movement of the mark-receiving surface but is also oscillated in a direction parallel to the direction of movement of the mark-receiving surface. This biharmonic oscillation can result in two types of traces as will be explained further herein.

Rectangular grids can be formed or approximated much more efficiently using these systems than in the case where the array is vibrated or moved perpendicular to the direction of movement of the mark-receiving surface. This means fewer marking elements need be used, the system can be operated at a higher rate of speed and/or higher definition can be obtained for the same number of elements.

The invention is described in detail below with reference to the drawing in which.

Figure 8:
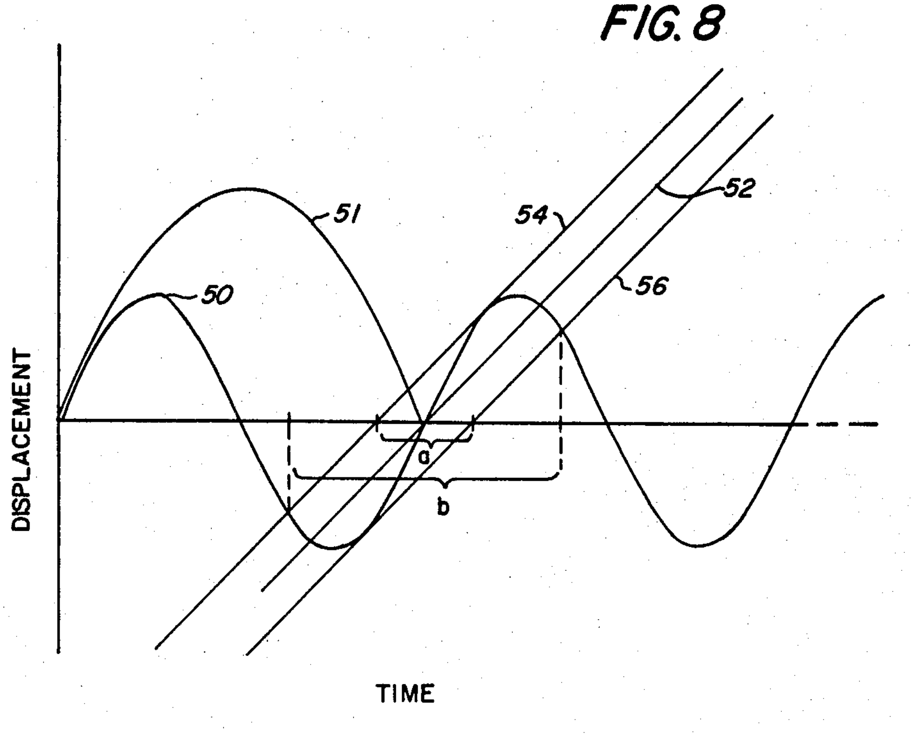

FIG. 8 is a graph, which shows the advantages of oscillating in both the perpendicular or "X" direction and the parallel or "Y" direction over the oscillation in the "X" direction only. By "X" direction is meant the direction perpendicular to the direction of movement of the mark-receiving surface. By "Y" direction is meant the direction parallel to the direction of movement of the mark-receiving surface.

Figure 9:
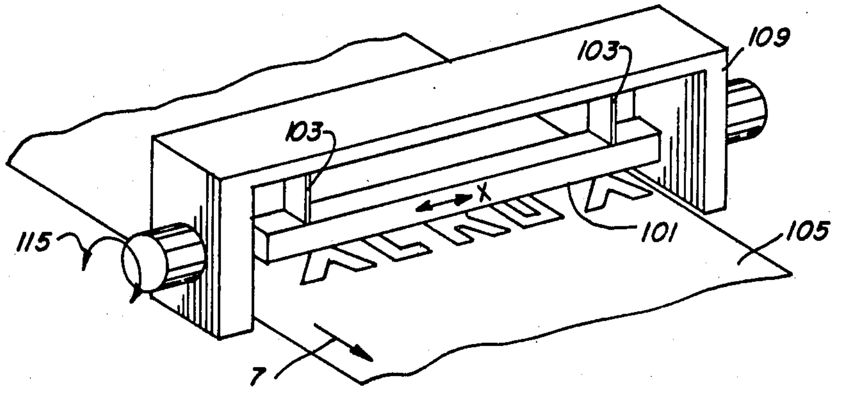
Figure 10:
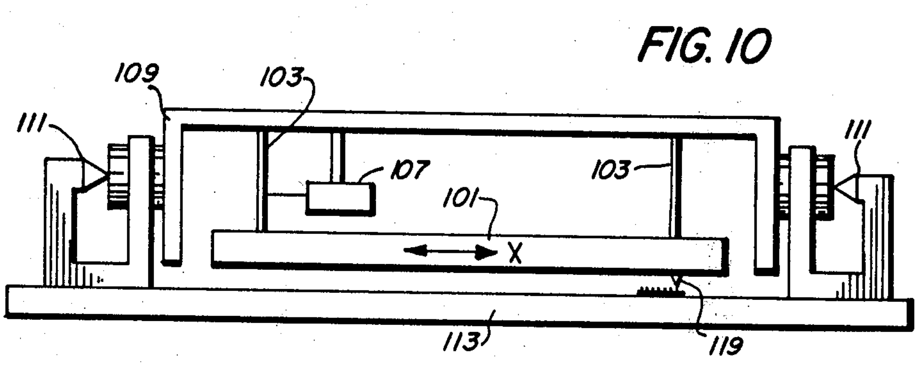
Figure 11:
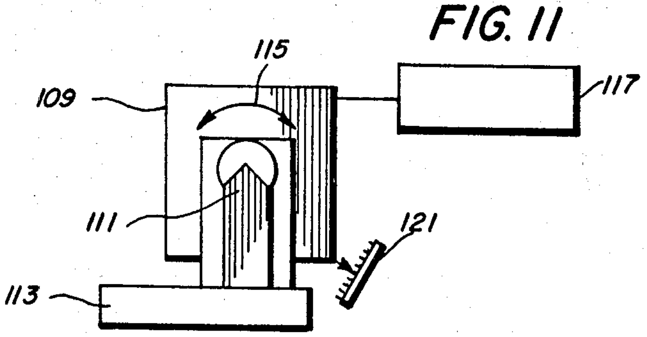

FIGS. 9–11 show an embodiment of a single apparatus, which can be used to provide movement both perpendicular and parallel to the mark-receiving surface movement.

Figure 1:
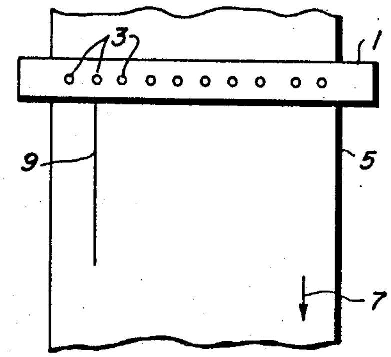
FIG. 1 PRIOR ART
FIG. 1 shows a stationary array bar.

Referring now to FIG. 1, there is shown an array bar 1 having marking elements represented by dots 3 thereon for marking on mark-receiving surface 5. These marking elements 3 can be, for example, electrodes, which leave a charge on an insulating surface that can be developed by known techniques. The marking elements 3 can also be magnetic recording heads for recording on a magnetic tape; or pins, which can be heated to form a mark on a heat-markable surface. Further, the marking elements could be ink jet units. The array bar 1 in FIG. 1 is held stationary while the mark-receiving record surface 5 is moved in the "Y" direction shown by arrow 7.

For clarity of understanding, in each of FIGS. 1–7 it is assumed that only one marking element is operated and that it is operated continuously to form a continuous trace. Operation of one marking element 3 on a stationary bar 1 results in a straight line trace 9. It can be seen that to form images of good definition on surface 5, a great many marking elements 3 would be required.

Figure 2:
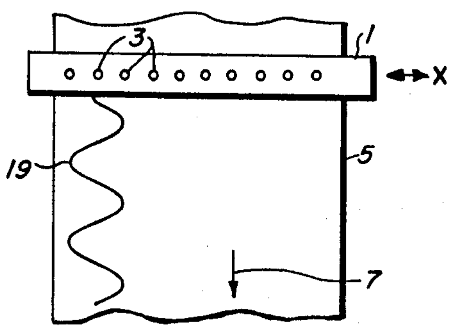
FIG. 2 PRIOR ART
FIG. 2 shows an array bar moved perpendicular to the mark-receiving surface direction of movement.

FIG. 2 shows a common technique for reducing the number of marking elements 3 required to form images. Here, array bar 1 is reciprocated in direction "X", that is, perpendicular to the direction of movement of mark-receiving surface 5. Here, the resulting trace 19 is sinusoidal as shown enlarged in FIG. 5. It can be seen that moving the array 1 in a direction perpendicular to the moving mark-receiving surface 5 cannot produce a rectangular array as efficiently as the systems shown in FIGS. 3 and 4.

Figure 3:
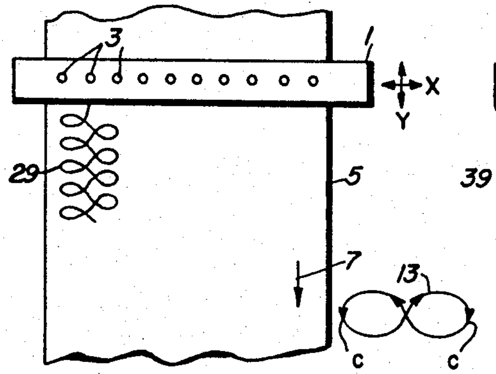
FIG. 3 shows one way in which movement is provided both perpendicular and parallel to the direction of movement of the mark-receiving surface.

Referring now to FIG. 3, array bar 1 is oscillated in both the "X" and "Y" directions as shown by curve 13. Curve 13 represents the motion of the array 1. Note that when the array is at either extremity in the "X" direction, that is, to the extreme right or left as indicated by points "c" in FIG. 3, the array 1 is moving parallel to and in the same direction as moving mark-receiving surface 5. The resultant trace 29 is shown enlarged at FIG. 6. It can be seen that a single marking element activated at points "A" through "G" produces a rectangular grid in an efficient manner. It can be seen that the key to the improvement in this case is that the marking elements all cross the same "X" direction line 11 more than once; the number of times depending on the relative size and speed of the oscillations versus the velocity of the mark-receiving surface.

Figure 4:
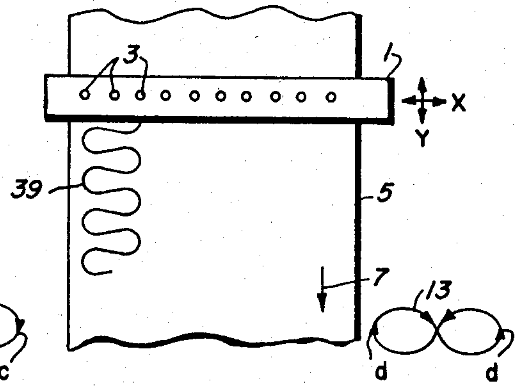
FIG. 4 shows a second method for providing movement in both the perpendicular and parallel directions.
Figure 5:
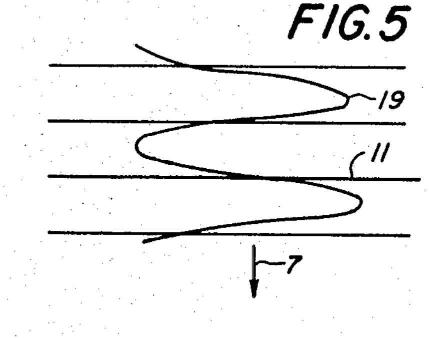
FIG. 5 shows the trace resultant from the perpendicular oscillation alone as in FIG. 2.
Figure 7:
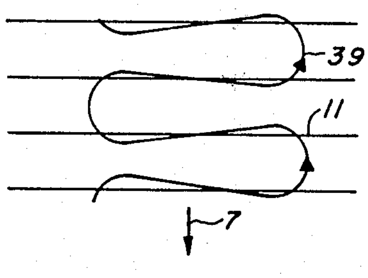
FIG. 7 shows the trace resulting from the biharmonic oscillations as shown in FIG. 4.
Figure 6:
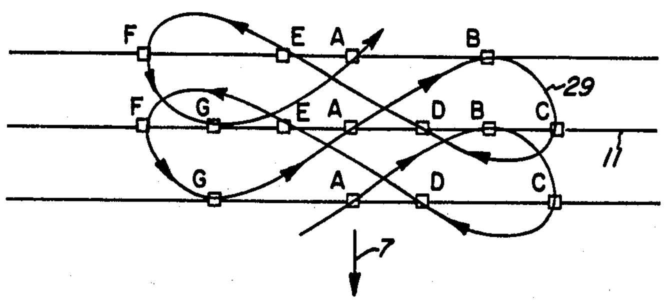
FIG. 6 shows the trace resulting from the biharmonic oscillations as shown in FIG. 3.

FIG. 4 shows the second method of oscillating the array 1 in both the "X" and "Y" directions. Here, however, when array bar 1 is in the extreme right or left position, as shown in FIG. 4, array bar 1 is moving parallel to the movement of mark-receiving surface 5 but in a direction opposite that of moving mark-receiving surface 5 as indicated at points "d". Here, the resultant trace 39 is shown enlarged in FIG. 7. It can be seen that trace 39 in FIG. 7 is closer to line 11 over a greater percentage of its cycle than is trace 19 in FIG. 5. This can be shown more clearly by reference to FIG. 8. Line 50 represents the "Y" direction displacement of the array 1. Line 51 represents the "X" displacement of array bar 1. It can be seen that the "Y" array cycle is harmonic to the "X" cycle. Line 52 represents the line of movement of a point on record-receiving surface 5. Lines 54 and 56 represent $\pm 10\%$ deviation from center line 52. It is assumed that a $\pm 10\%$ deviation in mark placement is acceptable. It can be seen then that for the case where there is no array displacement in the "Y" direction, the time in which marking can occur is represented by the time interval "a". With "Y" direction displacement, however, this time is expanded to that represented by time interval "b". This means fewer marking elements 3 may be used or that marking can be accomplished faster.

Referring now to FIGS. 9–11, which show perspective, side and end views, respectively, array bar 101 having marking elements (not shown) thereon is suspended from spring plates 103, which allow the array bar 101 to reciprocate in the "X" direction when driven by drive means 107 (FIG. 10), which may be, by way of example, a solenoid. Drive means 107 is rigidly mounted on frame 109. Frame 109 is in turn mounted for pivotal motion around pivot members 111, which pivot members are mounted on base 113. The "Y" direction movement is provided by reciprocating pivoting frame 109 around pivot 111 as shown by arrows 115. This pivoting action is caused by drive means 117, which is fixed to base 113 by means not shown. Drive means 117 may again be a solenoid. Sensors 119 and 121 may be provided, which in combination with control means (not shown) can be used to ensure that the "Y" and "X" displacements of array bar 1 are in phase.

Although specific embodiments and components have been described, it will be understood by those skilled in the art that various changes in the form and details may be made therein without departing from the spirit and scope of the invention. All such changes in form and detail should be considered as encompassed by the following claims.

What is claimed is:

1. A method of marking on a continuously moving mark-receiving surface, which comprises:

(a) providing a mark-receiving surface moving continuously in a first direction;

(b) oscillating an array of marking elements in a direction perpendicular to said first direction;

(c) also oscillating said array in a direction parallel to said first direction such that, when said array is at either extreme of its perpendicular direction oscillation, said array is moving in a direction parallel to and in the same direction of movement as said mark-receiving surface;

(d) causing said marking element to mark only when said marking elements are aligned with a predetermined line, said predetermined line being perpendicular to said first direction.

2. A method of moving an array of marking elements relative to a continuously moving mark-receiving surface, which comprises:

(a) moving a mark-receiving surface continuously in a first direction;

(b) oscillating an array of marking elements in a direction perpendicular to said first direction, such that the relative motion of said array over said mark-receiving surface forms a sine wave trace;

(c) modifying said sine wave trace to more closely define a rectangular grid trace by (d) oscillating said array in a direction parallel to said first direction in such manner that, when said array is at either extreme of its perpendicular direction oscillation, said array is moving in a direction parallel to but in the opposite direction as the direction of movement of said mark-receiving surface.

* * * * *